W. H. BALTES.
SIGNAL LIGHT FOR AUTOMOBILES.
APPLICATION FILED DEC. 10, 1917.
1,350,539.
Patented Aug. 24, 1920.
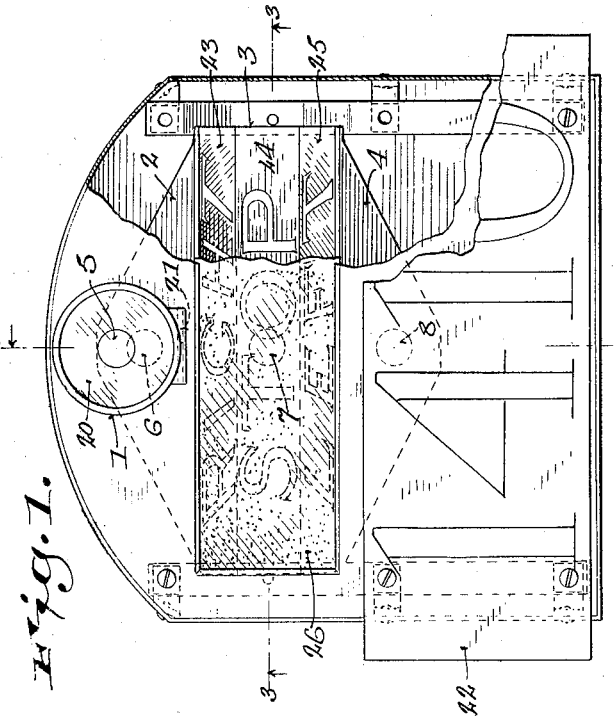
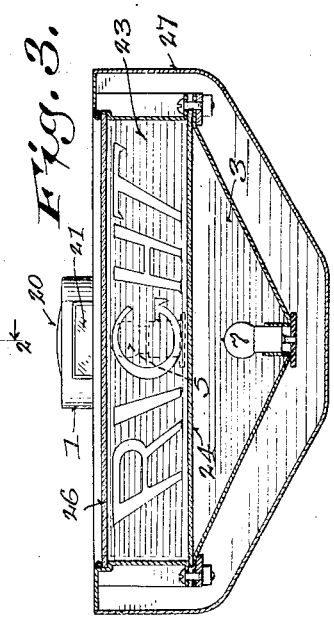
Inventor
Walter H. Baltes
By Erwin & Wheeler
Attorneys.

UNITED STATES PATENT OFFICE.

WALTER H. BALTES, OF MILWAUKEE, WISCONSIN.

SIGNAL LIGHT FOR AUTOMOBILES.

1,350,539.  Specification of Letters Patent.  Patented Aug. 24, 1920.

Application filed December 10, 1917. Serial No. 206,566.

*To all whom it may concern:*

Be it known that I, WALTER H. BALTES, a citizen of the United States, residing at Milwaukee, county of Milwaukee, and State of Wisconsin, have invented new and useful Improvements in Signal-Lights for Automobiles, of which the following is a specification.

My invention relates to signal lights for automobiles.

The object of my invention is, among other things, to produce a more efficient and economical signal for automobiles by which the driver or any other person in the car may by moving a switch indicate that the automobile is about to turn toward the right or left or stop, also by which a danger light may be shown and a separate light may be thrown upon the license number, by which such automobile may be distinguished from any other.

My invention is further explained by reference to the accompanying drawing, in which—

Figure 1 is a front elevation, part broken away to better disclose the interior construction.

Fig. 2 is a vertical section, drawn on line 2—2 of Fig. 1, and

Fig. 3 is a plan, drawn on line 3—3 of Fig. 1.

Like parts are referred to by the same reference numerals throughout the several views.

Located at the rear of the automobile are several casings 1, 2, 3, 4, each of which is provided with an ordinary incandescent electric lamp 5, 6, 7, 8, and all of said lamps are connected with the battery or other source of electric energy 9 through the several stationary switch terminals 10, 11, 12, and 13, and the revoluble switch member 14, and the several circuit wires 15, 16, 17, 18 and 19, whereby in case the operator wishes to turn his automobile toward the right he turns the revoluble switch member to the right, stopping the same over the switch member 10. In case he wishes to turn toward the left he moves the switch member 14 over the switch member 12, and in case he wishes to stop the automobile he turns the revoluble switch member over the switch member 13. When, however, the driver wishes to proceed direct on his way the revoluble switch member is moved over the switch member 11, whereby a red or other conspicuous light is continuously thrown from the lamp 5 through the lens 20, and whereby an additional light is thrown down through the transparent wall 21 to and upon the figures of the license number at 22.

The words "Right", "Left", and "Stop" are all adapted to be separately shown upon the vertical transparency 26 as the lamps 6, 7 and 8 are respectively lighted. 27 is a case which incloses the several chambers 1, 2, 3 and 4, and connects them with the license number 22. The switch mechanism is preferably located on the dash board in front of the driver where the same may be conveniently operated without turning, when the wires lead to the several lamps 5, 6, 7 and 8, as shown, in the ordinary way. The signals 23 and 25, due to their inclined position, may be viewed through the vertical transparency 26. The central signal 24, may be viewed directly through the said transparency.

Having thus described my invention what I claim as new and desire to secure by Letters Patent, is:—

1. An automobile signal comprising a casing having an oblong opening in its face and a transparency therefor; a central lamp-containing compartment arranged within the casing in spaced relation to the transparency and formed with sides diverging toward the latter; a pair of convergently related lamp-containing compartments arranged within the casing respectively above and below the central compartment and also having sides diverging toward the transparency, said pair of compartments having their wider ends interposed between the casing and the wider end of the central compartment and secured to the casing, above and below the transparency; the smaller ends of the compartments adapted to contain sources of light; and legend-bearing transparent plates secured in the wider ends of the compartments in abutting relation with each other and the transparency.

2. An automobile signal comprising a casing having an oblong opening in its face and a transparency therefor; a central lamp-containing compartment arranged within the casing in spaced relation to the transparency and formed with sides diverging toward the latter; a pair of convergently related lamp-containing compartments arranged within the casing respectively above and below the central compartment and also having sides diverging toward the transparency, said pair of compartments having their wider ends interposed between the casing and the wider end of the central compartment and secured to the casing, above and below the transparency; the smaller ends of the compartments adapted to contain sources of light; and legend-bearing plates secured in the wider ends of the compartments in abutting relation with each other and the transparency.

In testimony whereof I affix my signature in the presence of two witnesses.

WALTER H. BALTES.

Witnesses:
A. J. McKerchan,
Jas. B. Erwin.